Feb. 11, 1969   H. F. PHIPARD, JR   3,426,820
HIGH FRICTION SCREW
Filed Oct. 5, 1967   Sheet 1 of 2
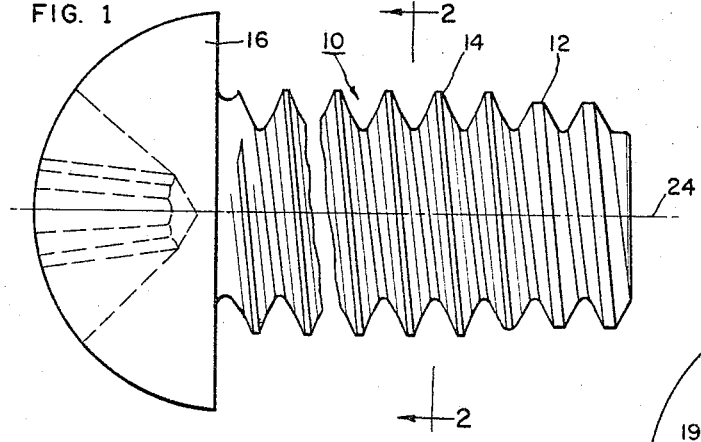
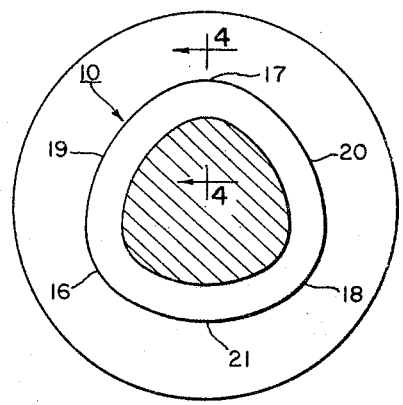
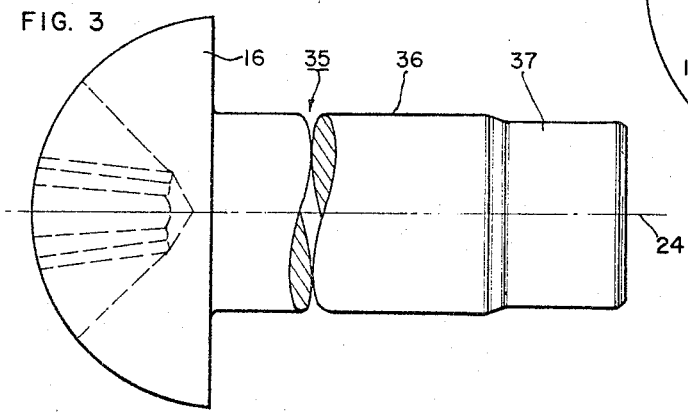
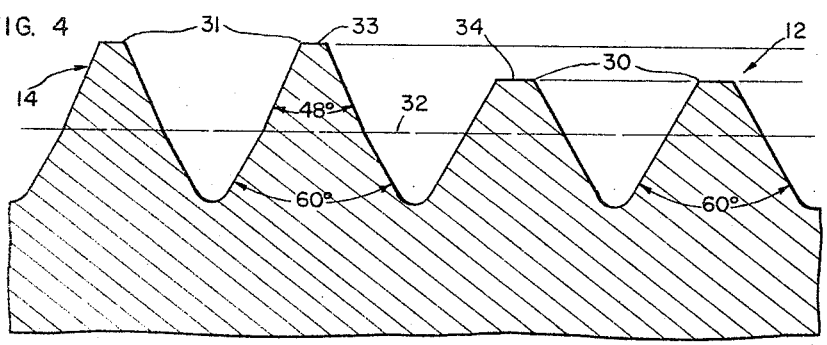
HARVEY F. PHIPARD JR.
INVENTOR
BY
BUCKHORN, BLORE, KLARQUIST & SPARKMAN
ATTORNEYS

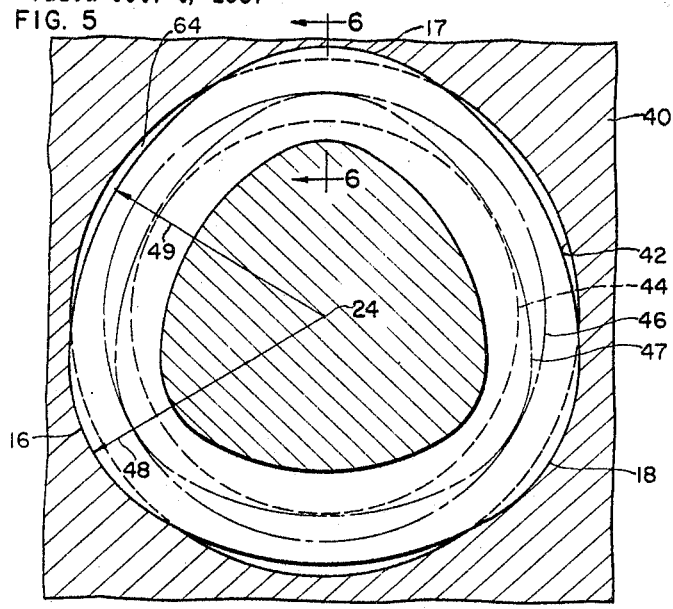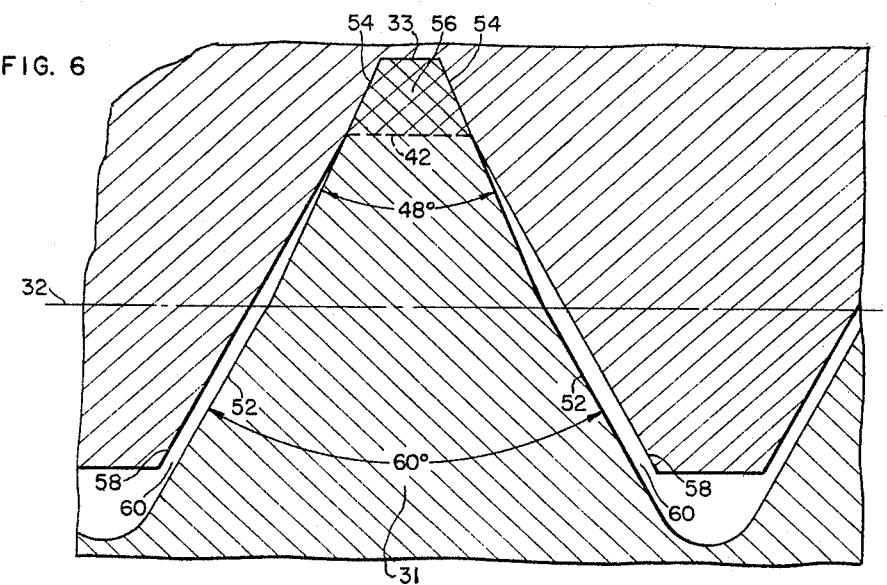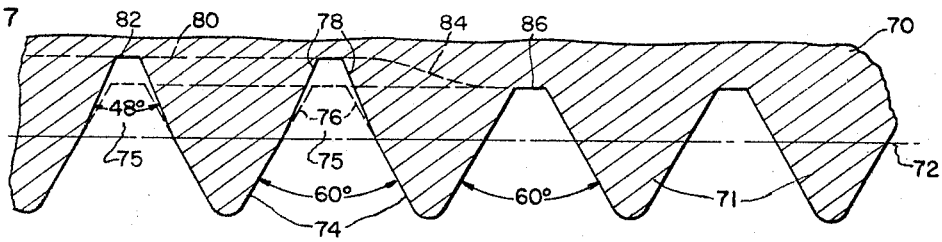

United States Patent Office 3,426,820
Patented Feb. 11, 1969

3,426,820
HIGH FRICTION SCREW
Harvey F. Phipard, Jr., South Dartmouth, Mass., assignor to Research Engineering & Manufacturing, Inc., New Bedford, Mass., a corporation of Massachusetts
Filed Oct. 5, 1967, Ser. No. 673,125
U.S. Cl. 151—22      2 Claims
Int. Cl. F16b 39/28, 33/02

ABSTRACT OF THE DISCLOSURE

A fastener of noncircular cross section is provided having predetermined interference with a female thread of circular cross section and of substantially uniform dimensions throughout. The fastener is of arcuate, polygonal cross section having circumferentially spaced apart lobes, the thread extending continuously over both the work-entering end and shank portions of the fastener. One or more thread turns on the work-entering end fit smoothly, with no interference, with the female thread. The succeeding turns on the shank portion of the fastener, however, are provided with circumferentially spaced apart lobular portions which outwardly of the pitch line have a greater height in the radial direction than the adjacent portions of the female thread outwardly of the pitch line thereof, providing interference between the outer portions of the lobes of the male thread and the root of the female thread.

BACKGROUND OF THE INVENTION

In my own prior Patent 3,249,142, dated May 3, 1966, entitled, "Lock Screw," there is described a screw having a thread which throughout the entire height thereof has a smaller included angle between its flanks than the corresponding standard included angle between the flanks of the female thread to be used therewith. Interference is thus created between the threads of the male and female members from one end of the mating threads to the other for providing a fastener having a relatively high retained torque. Because of the smaller than standard included angle between the opposite flanks of the screw thread throughout the entire height thereof, it was necessary in the manufacture of the thread-rolling dies to mill one thread groove at a time, which not only increased considerably the cost of such dies but also introduced other undesirable aspects. In accordance with the present invention, thread-rolling dies of relatively low cost manufacture are used and at the same time a screw having new and improved characteristics is produced thereby.

SUMMARY OF THE INVENTION

The present invention resides in an improved form of high friction fastener device in which at least the threaded shank portion is of arcuate, polygonal cross section including a plurality of circumferentially spaced apart lobes. At least one or more thread turns on the work-entering end portion of the fastener will fit smoothly with the thread turns of the female thread with no interference therebetween. The succeeding thread turns on the shank portion of the fastener device, however, are provided with circumferentially spaced apart lobes and the crests of such lobes project outwardly of the axis of the fastener a greater distance than the radial dimension of the root of the female thread so that a material interference occurs at least between the lobular portions on the screw shank and the female thread outwardly of the pitch line of such threads.

For forming the threads on the fastener device, a pair of standard, for example, 60° included angle, thread-rolling dies may be utilized and the bottoms of the die grooves which form the threads on the shank portion of the blank are remilled beyond the pitch line only by a pointed cutter. Because only a slight amount of metal is thus removed from the bottom portions of the die grooves, the cost of manufacture for the thread-rolling dies is very greatly reduced.

Moreover, by providing material interference only between the outermost portions of the male threads on the fastener shank and the female threads, and with the included angle of the male threads inwardly of the pitch line the same as that of the female thread, it has been found that a high driving torque is retained following a greater number of driving and removal operations than hitherto obtainable. Also, by providing a work-entering end having no interference with the female threads, a better feed is provided between the male and female parts, and therefore a more consistent and uniform high locking torque is obtained among a given quantity of screws.

It is one object of the present invention therefore to provide a new and improved fastener device which is provided with one or more thread turns upon the work-entering end having the same included angle between the flanks thereof and the same maximum radial extend as in the case of the female thread so that no interference occurs therebetween. The threads on the adjacent shank portion of the fastener device, however, differ in that they are provided with a plurality of circumferentially spaced apart lobes, the maximum radial dimension of which lobes is considerably greater than the maximum radial dimension of the female thread so that substantial material interference occurs between the lobes of the male thread on the shank portion and the root portions of the female thread.

A further object of the invention is to provide a new and improved die structure for use in rolling threads on fastener devices of the present invention in which the grooves provided for rolling threads on the shank portion of a blank are remilled only inwardly of the pitch line of such grooves so as to produce a lesser included angle between the innermost groove side walls.

BRIEF DESCRIPTION OF THE DRAWINGS

FIG. 1 is a side elevation of a screw in accordance with one form of the invention;

FIG. 2 is a schematic cross-sectional view taken generally along the line 2—2 of FIG. 1;

FIG. 3 is a side elevation of one form of a screw blank;

FIG. 4 is a longitudinal, sectional view through a portion of the threads of the fastener device taken along the line 4—4 of FIG. 2;

FIG. 5 is a schematic sectional view illustrating the fastener of the present invention threaded into a body providing a female thread;

FIG. 6 is a sectional view taken along the line 6—6 of FIG. 5; and

FIG. 7 is a partial, sectional view through a thread-rolling die constructed in accordance with the present invention.

DESCRIPTION OF THE PREFERRED EMBODIMENTS

Referring first to FIGS. 1 and 2, a fastener device 10, according to one modification, is shown having a work-entering end portion 12 and a shank portion 14 and with a continuous thread rolled on both portions. The other end of the device is provided with a driving head 16 of any desired form. As illustrated best in the schematic sectional view of FIG. 2, the threaded part of the fastener device 10 is of polygonal cross section, preferably of arcuate, triangular shape. The thread is provided with a plurality of lobes 16, 17 and 18 which merge smoothly with intermediate arcuate sides 19, 20 and 21, respectively, between each adjacent pair of lobes.

Referring particularly to the sectional view of FIG. 4, at least one or more thread turns 30 on the work-entering end portion of the fastener device are of standard cross section, or of the same cross section as that of the female thread, as viewed in the axial direction, and in the case assumed, the included angle between adjacent flanks of the threads 30 is approximately 60°. The radial dimension of the lobes of the thread turns 30 are also of predetermined height relative to axis 24 and complementary to that of the female thread so that the threads on the work-entering end portion will fit smoothly into a standard female thread without any interference therebetween.

The succeeding plurality of thread turns 31 on the shank portion of the fastener device are provided with a standard included angle, of approximately 60° inwardly of the pitch line 32 but outwardly of such pitch line the threads 31 have a smaller included angle, such as 48° or 30°, for example. As will be explained more fully hereinafter, and with particular reference to FIG. 6, the crests 33 of the thread turns 31 are sharper and project a predetermined distance above the crests 34 of the thread turns 30.

Although the fastener device 10 may be made in a plurality of different ways, I prefer to use a blank as illustrated in FIG. 3. This blank 35 consists of a shank portion 36, a head 16 and a dog-point 37 of a cross section slightly less than that of the shank portion 36. It will be recognized by those skilled in the art that it is not essential to provide a dog-point on the end of the blank during the heading operation, inasmuch as the excess metal beyond that required for forming the reduced height threads 30 can be rolled out to the end of the screw. The cross-sectional configuration of the blank portion 36 is the same as that shown in FIG. 2. The portion 37 may be of the same shape or may be round. Such a blank may readily be threaded as described in my Patent 3,195,156, July 20, 1965, but using thread-rolling dies as hereinafter described.

FIG. 5 illustrates schematically the fastener device threaded into a body 40, the female thread as originally provided therein being indicated by the root 42 and crest 44. The pitch surface of the female thread is indicated at 46 and, of course, this pitch surface will substantially coincide with the pitch surface 47 of the male screw only along the radial centerlines of the lobes 16, 17 and 18. The maximum radial dimension 48 of the male screw thread at the midpoints of the lobes is considerably greater than the original radius of the female root 42 and which in turn is greater than the radial dimension 49 of the sides 19, 20 and 21 of the screw.

In FIG. 6 is illustrated to an enlarged degree the relationship between the male and female threads at a midpoint of one of the lobes on the shank of the screw. As previously mentioned, the included angle between the flank portions 52 of the male thread inwardly of the pitch line 32 is the same as that of the female thread. Assuming that the female thread has a standard included angle, the included angle between the flank portions will be 60°. Outwardly of the pitch line 32, the included angle between the thread flank portions 54 is substantially less, such as for example, 48° or 30°. As previously indicated, the crest 33 is relatively sharp as viewed in FIG. 6, particularly as compared with the width of the root 42 of the female thread. In the drawing, the thread dimensions are greatly enlarged so that when reduced to thread size, the crest 33 in the illustrated embodiment for all practical purposes, is relatively thin and sharp, especially as compared with the width of the root base 42.

The area 56 between the root 42 of the female thread and crest 33 of the male thread represents a zone of material interference between the two threads. On account of the fact that the screw is the harder of the two materials, the metal from the interference zone 56 must be displaced during the threading operation. It is to be understood, however, that insofar as the present invention is concerned, it is not restricted to the relative hardness of the two materials and the claims are not limited in this regard. On account of the normal tolerance provided between male and female screw thread dimensions, small voids 60 will ordinarily occur between the flank portions 52 of the male thread and the adjacent portions of the thread flanks 58 of the female thread. Because of the small size of those voids, the metal of the body 40 will be compressed as much as possible in the axial direction between the relatively sharp and thin male screw thread lobes within the elastic limits of such metal. A certain amount of displacement may also take place in the circumferential direction to occupy the voids 64 on each of the opposite sides of each of the lobes and as indicated in the sectional view of FIG. 5.

On account of the smooth, long, sloping sides of the male thread on both the forward and rear sides of each of the lobes, no chips are formed during the threading operation. Since the driving of the screw 10 into the female thread is accompanied, to a large extent, by compression of the metal of the body 40 defining the female thread within the elastic limits thereof, a high driving and removal torque is retained following a multiplicity of repeated driving and removal operations.

Referring now to FIG. 7, a portion of a thread-rolling die 70 is illustrated in cross section. The portions of the ridges and grooves at the right side, as viewed in FIG. 7, are of standard form, that is, having an included angle of 60° both above and below the pitch line indicated at 72. In order to adapt such a standard thread-rolling die for the manufacture of screws in accordance with the present invention, those portions of the die which are provided for forming the thread turns 31 on the shank portion of the blank are remachined as indicated at the left in FIG. 8. In other words, the groove portions between the flanks 74 are machined below the pitch line 72 so as to remove the metal between the dotted lines 76 and the finished groove side wall portions 78. The included angle, as previously mentioned, between the groove side wall portions 78 may be 48°. The dotted line 80 indicates the plane of the bases 82 for the respective grooves which at the right end, as indicated at 84, curves upwardly to the level of the bases 86 for the groove portions between the ridge portions 71. By starting with a set of standard thread-rolling dies and which may be machined in accordance with conventional procedures and with rugged and durable 60° included angle multiple cutters, and thereafter machining out merely the bottoms of those groove portions which are to form the thread turns 31, greatly facilitates the manufacture of thread-rolling dies, particularly for manufacture of fasteners of the present invention. The procedure for milling out merely the base portions of the grooves 75 between dotted lines 76 and the lines 78 can readily be done with single point type cutters.

By not providing any interference between the work-entering threads 30 of the fastener device and the female threads, the fastener can be introduced easily into the female thread and started therein in a straight coaxial direction before interference occurs between the threads 31 and the female threads. Due to the polygonal shape of the fastener device and with the interference restricted to only the spaced apart lobes, the driving torque can easily be held within the strength limitations of the fastener device.

From the foregoing description, it will be obvious that the turn or turns 30 on the work-entering portion 12 of the fastener device need not necessarily be of arcuate, polygonal cross section nor of the same cross-sectional configuration as the next succeeding plurality of threads 31 on the shank portion 14. In view of the fact that the threads 30 on the work-entering end portion serve merely properly to start the fastener device into the female threaded part and are intended to fit or mate smoothly and complementarily therewith, these threads may, if desired, be of circular cross-sectional configuration.

Moreover, the circumferentially spaced apart lobes on the shank portion of the device need not necessarily be formed in the particular manner referred to and may be formed in any other suitable manner. Likewise, it is to be understood that the invention is not to be restricted to threads of the conventional machine screw configuration illustrated in that the invention is equally applicable to any other form of thread, such as square threads, Acme threads, or the like.

In view of the foregoing description, it is obvious that the illustrated embodiment constitutes only one form of the present invention and which may be carried out in various different alternative forms. By the following claims, it is therefore intended to cover all such obvious variations and modifications as fall within the true spirit and scope of the invention.

What I claim as my invention is:

1. In the combination of a threaded male member and a threaded female member, the thread in said female member being of circular cross section and of uniform standard dimensions throughout, said male member having work-entering and shank portions with a fully formed thread of uniform root diameter extending continuously throughout both said portions, the crest and root of the thread on said male member on both said work-entering and shank portions being of arcuate, polygonal cross section including arcuately curved sides and intermediate circumferentially spaced apart lobes, the crest of said lobes extending a greater distance radially outwardly from the axis of said male member than the crest of the thread portions intermediate said lobes, said lobes merging smoothly and gradually with the thread portions of said male member on opposite sides thereof, the invention comprising:

(a) said thread on said male member including at least one turn on said work-entering end in which the mid-portion of said lobes fit smoothly and complementarily within the thread of said female member with no interference therebetween, (b) the thread on said shank portion including a plurality of turns adjacent said work-entering end in which the included angle of portions thereof outwardly of the pitch line of the thread is slightly less than that of the portions thereof inwardly of the pitch line and also less than that of the thread of said female member, and the maximum distance of the crest of the lobes from the axis of said male member is greater than the distance of the root of the thread of said female member from the axis thereof, whereby the crests of said lobes have predetermined interference with the root of the thread of the female member, (c) said interference diminishing progressively to zero in the circumferential direction on each of the opposite sides of the midpoints of said lobes.

2. The invention as defined in claim 1 in which the included angle of the fastener thread on said shank portion inwardly of the pitch line thereof is substantially the same as the included angle of the thread of said female member.

References Cited

UNITED STATES PATENTS

| Re. 24,572 | 12/1958 | Welles | 10—152 |
| 1,451,484 | 4/1923 | Woodward | 151—22 |
| 2,679,774 | 6/1954 | MacDonald | 151—22 |
| 3,249,142 | 5/1966 | Phipard | 151—22 |

CARL W. TOMLIN, *Primary Examiner.*

RAMON S. BRITTS, *Assistant Examiner.*

U.S. Cl. X.R.

85—46